July 10, 1934.                R. W. MITCHELL                1,965,748

COMPOSITE PIPE AND METHOD OF MAKING SAME

Filed Feb. 4, 1933

INVENTOR
R.W. MITCHELL.

ATTORNEY

Patented July 10, 1934

1,965,748

UNITED STATES PATENT OFFICE 1,965,748

COMPOSITE PIPE AND METHOD OF MAKING SAME

Robert W. Mitchell, Westmount, Quebec, Canada

Application February 4, 1933, Serial No. 655,172

17 Claims. (Cl. 72—54)

This invention relates to improvements in composite pipes designed to withstand considerable internal pressures; particularly those having an outer portion of concrete, or other readily fracturable non-metallic material of low tensile strength, and an internal pressure resisting structure.

It has been found that when a composite pipe, such as a reinforced concrete pipe, is subjected to internal pressures corresponding to tensile stresses (circumferentially of the pipe) in the reinforcement which stresses are much below the elastic limit of the reinforcement, the concrete cracks. For example, when a concrete pipe circumferentially reinforced with drawn open drawn hearth steel wire of .6 carbon content (which has an elastic limit of 125,000 lbs.) is subjected to internal pressure corresponding to a tensile stress of 15,000 lbs. per square inch of cross section of the reinforcement, the above mentioned cracking of the concrete outside the reinforcement occurs. This condition is highly undesirable even if leaking does not ensue. The concrete tends to separate from the reinforcement, which is then subject to corrosion where it is exposed by the cracks or by sloughing off of the concrete. Obviously, it is possible to avoid the foregoing undesirable conditions by using sufficient reinforcement so that for any given pressure the tensile stress in the reinforcement is materially less than that at which cracking of the concrete occurs. Equally obvious is the fact that increase in the amount of reinforcement used increases the cost of the pipe and thereby minimizes one of the principal advantages of composite pipe, namely, its low cost.

It has been previously proposed to place circumferential reinforcement of concrete and other pipes under initial tension so that the tensile strength of the reinforcement is developed at the outset. This initial tensioning of the reinforcement does not, however, overcome or prevent the elongation of the reinforcement due to pressure in the pipe, which elongation is proportional to the stress up to the limit of elasticity. Thus, regardless of whether the reinforcement is initially tensioned or not, there will be an elongation of the reinforcement proportional to the internal pressure imposed on the pipe and readily calculable according to well known formulæ.

This invention aims primarily to prevent cracking of the non-metallic portion of the pipe outside the reinforcement by reason of subjection of the pipe to internal pressure, while employing a minimum of reinforcement.

The foregoing object is accomplished by subjecting the metal portion of the pipe to internal pressure, preferably somewhat greater than that which the pipe is designed to withstand, and while the metal portion is under this pressure and circumferentially expanded thereby, assembling the outer non-metallic covering to it; the pressure being maintained until the outer covering has hardened sufficiently to resist contraction by the metal when it contracts upon relief of the pressure. The covering is thus free from internal pressure both when the pipe is under pressure and when it is relieved of this pressure. Any contraction of the metal away from the outer covering incident to relief of internal pressure has not been found detrimental. When the complete pipe is again subjected to pressure, the expansion of the metal does not cause cracking of the outer non-metallic covering so that the metal remains fully protected against corrosion.

In the case of a pipe composed mainly of concrete, or other non-metallic material, the inner portion or lining of concrete and the encircling metal reinforcement may be assembled and subjected to pressure which is maintained while the outer concrete portion is being applied and is setting.

The assembling of the outer non-metallic covering to the other elements of the pipe may be effected in a manufacturing plant and the completed pipes shipped to the point of use or, alternatively, the metal portion of the pipe and the non-metallic lining (if any) may be assembled in a manufacturing plant, shipped to the point of use, and the lengths of pipe laid and jointed, and the whole pipe line then subjected to internal pressure which is maintained while the outer covering is being put in place and is setting.

It will be apparent that by practice of this invention a composite pipe, proof against external cracking by reason of internal pressure, may be manufactured using, for any pressure, materially less metal than is customarily provided. In fact, the amount of metal used need not be more than will have an elastic limit equal to the internal pressure to be sustained by the pipe plus, of course, a suitable factor of safety.

This invention is particularly applicable to the manufacture of pipes of the general type disclosed in United States Patents Nos. 1,910,642 and 1,910,643, granted May 23, 1933, according to which the pipe comprises essentially a non-metallic lining within a fluid tight core of thin sheet metal incapable of withstanding the internal pressures for which the pipe is designed, the core being externally supported by circumferential reinforcement against the internal pressure and the reinforcement protected against corrosion by a non-metallic covering. In pipes of this character, cracking of the lining is immaterial since the core prevents access of the fluid contents of the pipe to the outer covering with consequent transmission of the fluid pressure to the outer covering. It will be understood, however, that application of the invention is not confined to pipes of the above character but extends to pipes made without fluid tight metal cores.

In order to afford a better understanding of the invention and the manner of practising same, reference is made to the accompanying drawing and the following description relative to same, but it is to be understood the disclosure of the said drawing and description is not limitative, either in general or in detail, but is purely explanatory and that the invention contemplates all such modifications of, or substitution of equivalents for, the features of the disclosure as shall fall within the scope of the appended claims.

In the accompanying drawing:—

Figure 1:
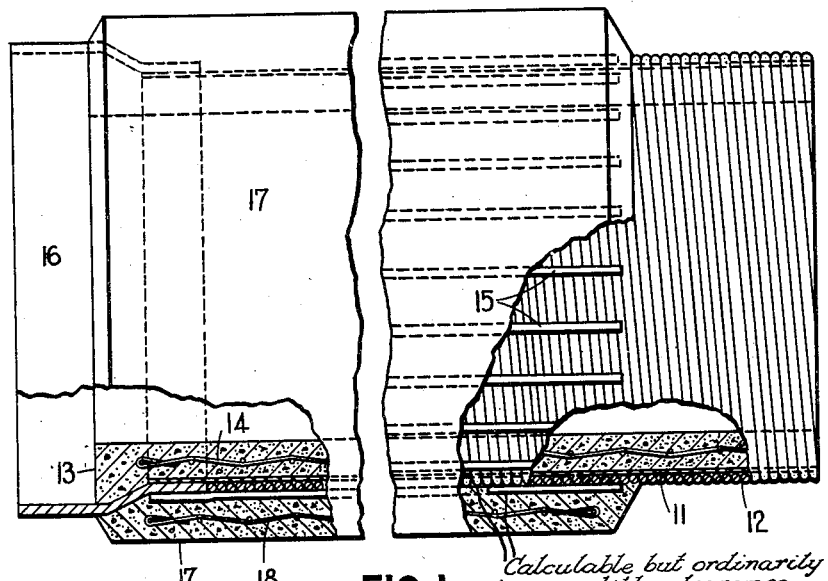
Fig. 1 is a side elevation of one form of pipe constructed according to this invention, parts being broken away to disclose the internal structure.
Figure 2:
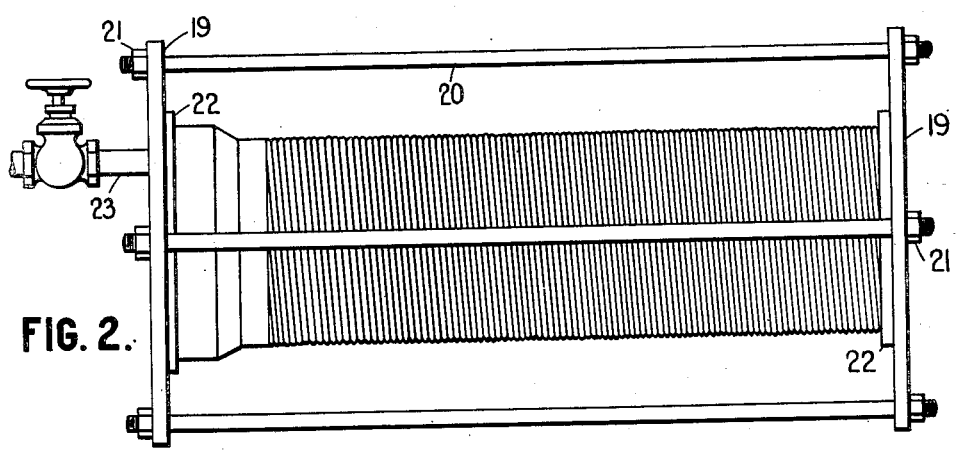
Figs. 2 and 3 illustrate one manner of applying internal fluid pressure to the pipe in course of manufacture.

Referring more particularly to the accompanying drawing, 11 designates a fluid tight tubular metal core around which is disposed any suitable sort of encircling metal reinforcing, for example the helically disposed wire winding 12, which is secured to the core in any suitable way, such as by welding or brazing at suitable intervals. A non-metallic lining 13 is provided within the core and this lining may be provided with internal reinforcing 14 of any suitable sort to prevent disintegration of the lining in the event of fracture. The lining may be applied centrifugally by any well known process, or otherwise. If desired, longitudinal reinforcing 15 may be secured in any suitable way to the circumferential reinforcing 12. A mouth ring 16 may be secured to the core at one end and formed to constitute a bell mouth permitting telescopic assembly of pipes to one another in the well known manner.

According to one method of manufacture, the ends of the lined and reinforced core are closed by any suitable means and a fluid under pressure is introduced into the pipe, the pressure being preferably somewhat greater than the maximum internal pressure the finished pipe is intended to carry. Increase of the circumferential dimension of the core and corresponding circumferential elongation of the reinforcement results according to well known formulæ, the change of dimension being proportional to the pressure within the pipe and the amount of change depending on the nature and sectional area of the material of which the core and reinforcement are composed. While the core, reinforcement and lining are in the expanded condition due to the internal pressure, the outer covering 17 of concrete or other non-metallic material is applied in any suitable way, such as by moulding or plastering on. The internal pressure is maintained during the whole or a suitable part of the period required for setting of the material forming the outer covering, i. e., until the covering is sufficiently rigid to resist contraction by the reinforcement when the same contracts upon relief of the internal pressure. Any suitable internal reinforcing 18 may be provided in the covering. When the covering has set to suitable degree, the pressure within the pipe is released and, theoretically at least, the reinforcing 12 contracts slightly away from the covering. If the pipe is again subjected to internal pressure, the lining, core and reinforcing 12 can expand within the covering. The pressure may even be somewhat greater than used in process of making the pipe without danger of cracking the covering, since the latter has some elastic limit of its own and is not subjected to any internal pressure by expansion of the inner parts of the pipe until the pressure in the pipe exceeds that used in manufacture.

Alternatively, the core and reinforcement may be covered as already described and the lining applied last.

Figure 3:
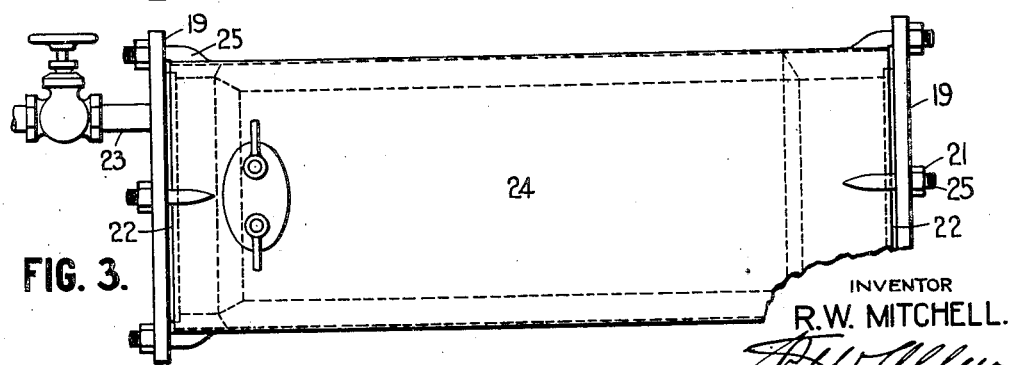

The ends of the pipe may be closed and pressure imposed in the pipe in a variety of ways of which only one is illustrated and comprises a pair of cover plates 19 for the ends of the pipe and means connecting the plates and adapted to hold them tightly against the ends of the pipe. The said connecting means may be a series of tie bars 20 passing through the plates and threaded at one or both ends and provided with nuts 21 outside the plates for clamping the plates against the pipe ends. Gaskets 22 may be provided between the plates and pipe ends if desired. One of the plates may be provided with a valved inlet and outlet pipe 23 through which a fluid may be introduced into the pipe and pressure applied. The bars 20 may be replaced by a tubular member 24 (Fig. 3), which will constitute a mould for the covering. Such a mould would be provided at its ends with threaded lugs 25 co-operating with the plates and nuts as in the case of the bars. Obviously, any suitable form of mould may be inserted between the pipe and bars for moulding of the covering, or the covering may be plastered on through the intervals between the bars.

Alternatively, and as previously stated, a number of partially completed pipe lengths each comprising lining, core and encircling reinforcement may be laid and jointed to constitute a pipe line, which is subjected in situ to internal pressure and the pressure held while the covering is applied and allowed to set.

In the manufacture of high pressure composite pipe as heretofore practised, cracking of the concrete or the like has been prevented by using a large amount of encircling reinforcing, so that the stress per square inch of section in the reinforcing, when the pipe is under pressure, is small and in consequence the elongation of the reinforcing in the circumferential direction of the pipe is substantially within the elastic capacity of the concrete covering. The large amount of reinforcement thus used makes for high cost.

It will be readily seen that according to this invention, since provision is made for free expansion of the reinforcement to any desired extent within the covering, without subjecting the covering to such internal pressure as would disrupt it, the amount of circumferential reinforcement may be much less than has heretofore been customary in composite pressure pipe and, in fact, may be very little more than that actually required to withstand the pressure. In other words, the amount of reinforcement may be reduced to such an extent that the tensile stress in service approaches close to the elastic limit of the material. The pipe thus produced is lighter and cheaper.

While the pipe as heretofore described contemplates a non-metallic lining, it will be understood the invention is not thus limited, since the lining may be omitted and a fluid tight metal structure, such as an ordinary cast iron or steel plate pipe or a composite metal structure such as hereinbefore described, subjected to internal pressure sufficient to cause some expansion thereof and a non-metallic covering applied to the metal structure while it is expanded, the pressure being maintained until the covering is sufficiently hard to resist contraction by reason of contraction of the metal structure consequent to relief of the internal pressure.

It will be understood in relation to this invention that while the circumferential enlargement of the metal portion of a composite pipe when under pressure is scarcely perceptible, being only a small fraction of an inch for a pipe several feet in diameter, there is nevertheless a definite calculable enlargement which results in transmitting outward pressure to concrete outside of and in intimate contact with the metal and that it is the pressure or force thus transmitted, rather than any amplitude of movement of the metal, which causes fracture of the concrete.

Practice of this invention provides a clearance or free play between the metal structure and concrete covering, which clearance or play need not be more than sufficient to prevent transmission of force, as aforesaid, from the metal to the encircling concrete and is therefore not of necessity perceptible. Wherefore, in the foregoing specification and in the following claims, expressions indicating circumferential enlargement of the metal structure and clearance between it and the concrete are not to be construed as necessarily indicating perceptible or measurable enlargements or clearances, but merely as calculable enlargements or clearances.

While, in the foregoing description, it has been stated the cement covering is applied after the lining and circumferential reinforcing are subjected to and have been expanded by internal pressure, it will be understood the covering material may be applied before the lining and reinforcing are subjected to pressure provided the pressure is applied while the covering material is still in substantially fluid condition and before setting has commenced. For example, the lining and circumferential reinforcing may be introduced into a mould and the fluid cement mixture filled into the mould around the reinforcement and consolidated as desired before the pipe is subjected to internal pressure. This method has the advantages that the expansion of the lining and reinforcement serves to further consolidate the material of the covering and that the mould is more easily handled for filling in the covering material if it is not connected to the fluid pressure source.

Having thus described my invention, what I claim is:—

1. A method of making composite pipes which comprises covering the pressure resisting internal metal portion of a pipe with an external layer of plastic non-metallic material; subjecting the entire assembly to internal pressure such as will cause some circumferential enlargement of the metal portion and maintaining said internal pressure during the period of time required for setting of the covering to such state of rigidity that it will not be contracted by the said inner portion when the same contracts consequent to relief of the said internal pressure.

2. A method of making composite pipes which comprises covering the metal structure with a plastic non-metallic material; subjecting the entire assembly to such internal pressure as will cause some circumferential enlargement of the metal structure; and maintaining the pressure during such time as is required for the covering material to set to a state of rigidity such that it will not be contracted by the metal structure when the same contracts upon relief of the said internal pressure, whereby upon relief of the pressure a clearance will be provided between the metal and covering sufficient to prevent transmission of force by the metal to the covering upon re-establishment of the internal pressure.

3. A method of making composite pipes which comprises forming a fluid tight inner portion of a pipe, said portion including a pressure resisting metal structure; applying an outer covering of soft non-metallic material to the said inner portion; subjecting the said inner portion to such internal pressure as will cause circumferential enlargement thereof capable of exerting an outward pressure in excess of the ultimate tensile strength which the non-metallic material will have when hard; and maintaining the pressure while the non-metallic covering sets to such degree of rigidity that it will resist contraction by the inner portion when the same contracts consequent to relief of the said internal pressure.

4. A method of making composite pipes, which comprises subjecting a fluid tight tubular structure, including a pressure resisting metal structure, to internal pressure; providing a rigid non-metallic covering in intimate contact with said tubular structure while the same is subjected to the internal pressure; and releasing the pressure whereby a calculable but ordinarily imperceptible clearance is established between the inner structure and the covering.

5. A method of making composite pipes, which comprises assembling together a fluid tight inner pipe portion, including a pressure resisting metal structure, and a rigid non-metallic covering; and causing said inner portion to contract to a calculable but ordinarily imperceptible extent away from the covering thereby to establish a clearance between the inner portion and the covering such as will prevent transmission of internal pressures in the pipe to the said covering.

6. A method of making composite pipes, which comprises assembling together a non-metallic lining and a metallic reinforcing encircling the lining; subjecting the assembled lining and reinforcing to internal pressure; assembling a non-metallic covering to the aforesaid assembly while the same is under pressure.

7. A method of making reinforced concrete pipes, which comprises assembling together a concrete lining and an encircling metallic reinforcing; subjecting the reinforced lining to internal pressure and applying a concrete covering on the reinforcing, the internal pressure being maintained during the application and setting of the concrete covering.

8. A method of making composite pipes which comprises assembling together a tubular metal core; a non-metallic lining for said core and an encircling metal reinforcement for said core and lining; applying a non-metallic covering upon the reinforcement; and subjecting the assembly to internal pressure, the said internal pressure being maintained during such time as is required for the covering to assume a substantially rigid state.

9. A method of making composite pipes, which comprises assembling together a non-metallic lining and an encircling metal reinforcement; applying a non-metallic covering to the lining and reinforcement; and subjecting the assembly to internal pressure such as to cause a slight circumferential expansion of the lining and reinforcement; and maintaining the pressure until such time as the covering has assumed a substantially rigid state.

10. A method of making composite pipes, which comprises assembling together a non-metallic lining and an encircling metal reinforcement; subjecting the assembly to internal pressure such as to cause a slight circumferential expansion of the lining and reinforcement; applying a non-metallic covering to the expanded lining and reinforcement; and maintaining the pressure until such time as the covering has assumed such state of rigidity that it will not be contracted by the contraction of the reinforcement upon relief of the internal pressure.

11. A composite pipe including a pressure resisting metal structure and a non-metallic covering for said metal structure spaced sufficiently from the metal structure to permit of the circumferential enlargement of the metal structure due to pressure within the pipe without transmission of outward pressure from the metal structure to the non-metallic covering sufficient to fracture the covering.

12. A composite pipe including a pressure resisting metal structure and a non-metallic covering encircling said metal structure and spaced therefrom a calculable but not necessarily perceptible distance thereby to prevent transmission of cover disruptive pressure from the metal structure to the covering when the metal structure is circumferentially enlarged by pressure within the pipe.

13. A composite pipe including a fluid tight pressure resisting metal structure and a non-metallic covering encircling said metal structure and spaced therefrom a calculable but not necessarily perceptible distance, thereby to prevent transmission of cover disruptive pressure from the metal structure to the covering when the metal structure is circumferentially enlarged by pressure within the pipe.

14. A composite pipe comprising a fluid tight inner portion including a pressure resisting metal structure and a non-metallic covering encircling said metal structure and spaced therefrom a calculable but not necessarily perceptible distance, thereby to prevent transmission of cover disruptive pressure from the metal structure to the covering when the metal structure is circumferentially enlarged by pressure within the pipe.

15. A composite pipe comprising a fluid tight tubular metal member; metal reinforcing encircling said member and a non-metallic covering outside the reinforcing and spaced therefrom a calculable but not necessarily perceptible distance thereby to prevent transmission of cover disruptive pressure from the metal structure to the covering when the metal structure is circumferentially enlarged by pressure within the pipe.

16. A composite pipe comprising a thin walled fluid tight tubular metal member; a non-metalic lining within and supporting said metal member; metal reinforcing encircling said member and a non-metallic covering outside the reinforcing and spaced therefrom a calculable but not necessarily perceptible distance thereby to prevent transmission of cover disruptive pressure from the metal structure to the covering when the metal structure is circumferentially enlarged by pressure within the pipe.

17. A composite pipe comprising an outer rigid non-metallic portion and an inner fluid tight portion including a pressure resisting metal structure, the internal diameter of said outer portion being greater than the external diameter of the inner portion to such extent as is necessary to permit expansion of the inner portion by pressure within the pipe without transmission of disruptive pressure to the outer portion.

ROBERT W. MITCHELL.